United States Patent [19]

Sherman et al.

[11] Patent Number: 5,075,884
[45] Date of Patent: Dec. 24, 1991

[54] MULTILEVEL SECURE WORKSTATION

[75] Inventors: Richard H. Sherman, Fremont; George W. Dinolt, San Jose; Frank Hubbard, Los Altos Hills, all of Calif.

[73] Assignee: Loral Aerospace Corp., New York, N.Y.

[21] Appl. No.: 137,549

[22] Filed: Dec. 23, 1987

[51] Int. Cl.$^5$ .................. G06F 15/16; G06F 15/48; G06F 12/00; G06F 3/037

[52] U.S. Cl. .................. 395/650; 364/230; 364/237.2; 364/237.82; 364/243; 364/246.6; 364/DIG. 1

[58] Field of Search ... 364/200 MS File, 900 MS File; 380/24

[56] References Cited

U.S. PATENT DOCUMENTS

| | | | |
|---|---|---|---|
| 4,087,856 | 5/1978 | Attanasio | 364/200 |
| 4,184,200 | 1/1980 | Wagner et al. | 364/200 |
| 4,484,302 | 11/1984 | Cason et al. | 364/900 |
| 4,550,386 | 10/1985 | Hirosawa et al. | 364/900 |
| 4,642,790 | 2/1987 | Minshull et al. | 364/900 |
| 4,644,496 | 2/1987 | Andrews | 364/900 |
| 4,646,261 | 3/1987 | Ng | 364/900 |
| 4,648,061 | 3/1987 | Foster | 364/900 |
| 4,658,351 | 4/1987 | Teng | 364/200 |
| 4,688,167 | 8/1987 | Agarwal | 364/200 |
| 4,713,753 | 12/1987 | Boebert et al. | 364/200 |
| 4,823,108 | 4/1989 | Pope | 340/721 |
| 4,845,644 | 7/1989 | Anthias et al. | 364/521 |
| 4,882,752 | 11/1989 | Lindman et al. | 380/25 |

OTHER PUBLICATIONS

IBM Technical Disclosure Bulletin, "Data Base Security/Authorization Mechanisms", vol. 28, No. 3, Aug. 1985, pp. 942–947.

Loscocco, Peter, A Security Model and Policy for a MLS LAN, *Security & Privacy Conference*, Berkeley, Calif., Oct./87, pp. 25-37.

*Primary Examiner*—Gareth D. Shaw
*Assistant Examiner*—John Q. Chavis
*Attorney, Agent, or Firm*—Townsend and Townsend

[57] ABSTRACT

A computer workstation having a window output display for potential use in security-sensitive environments provides multilevel security by physical isolation of processes in predefined security levels, each process or like-classified group of processes is displayed only through a suitably labeled window, access to the window requiring access through a previously security qualified physical signal path. The invention does not compromise security by mixing a software-based security environment with other untested software. All security is hardware-based.

9 Claims, 6 Drawing Sheets

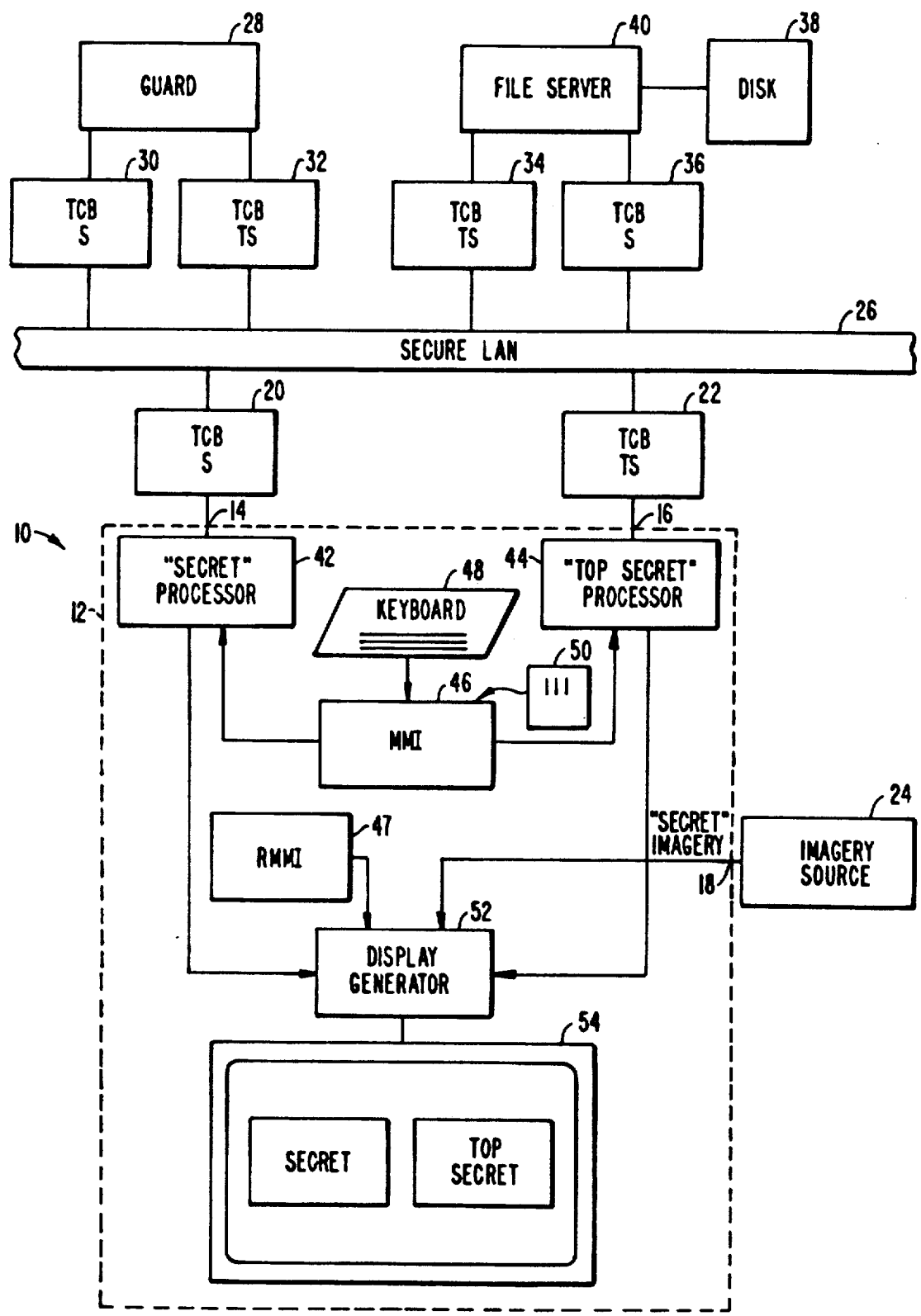
FIG._1.

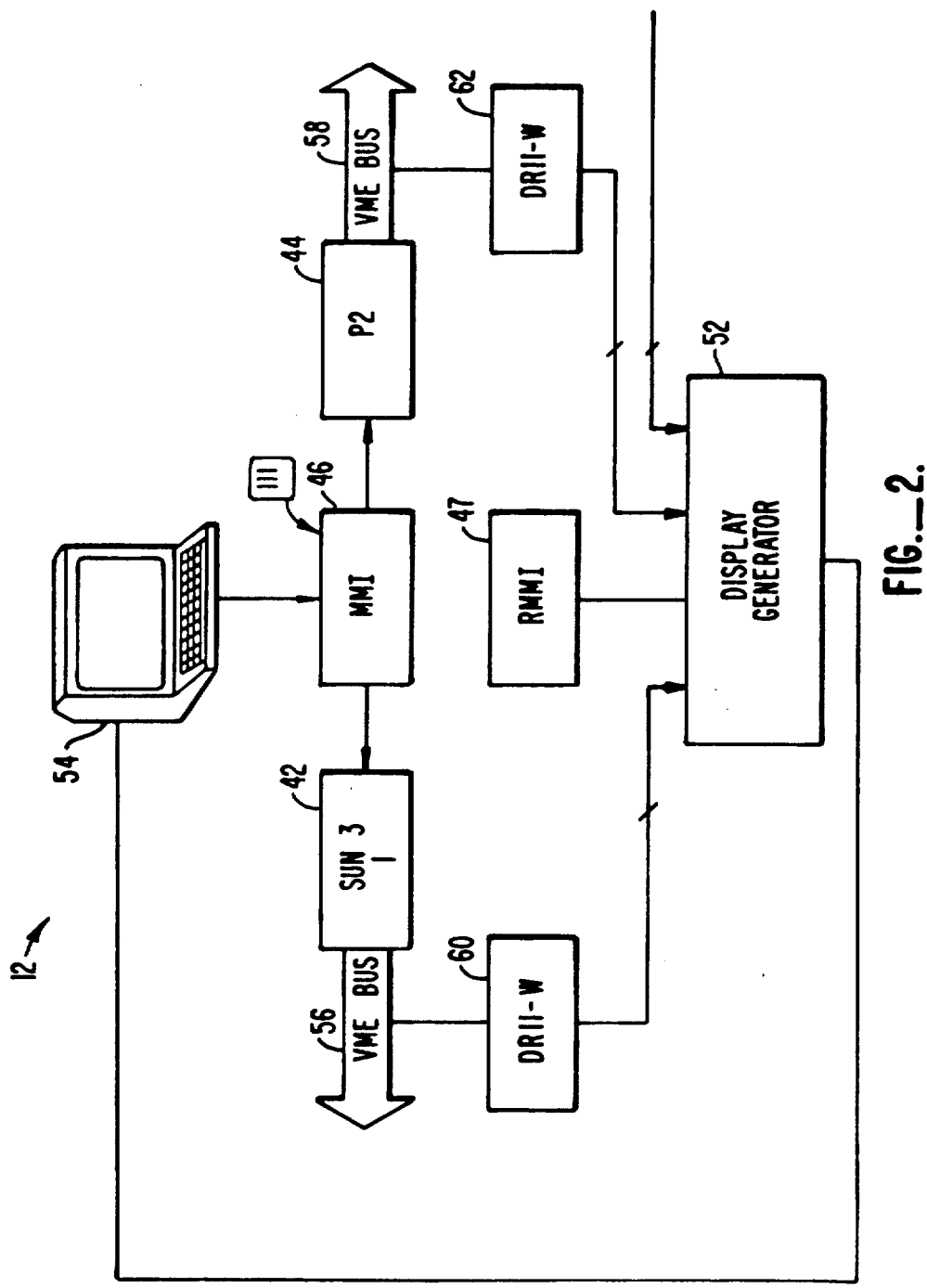
FIG._2.

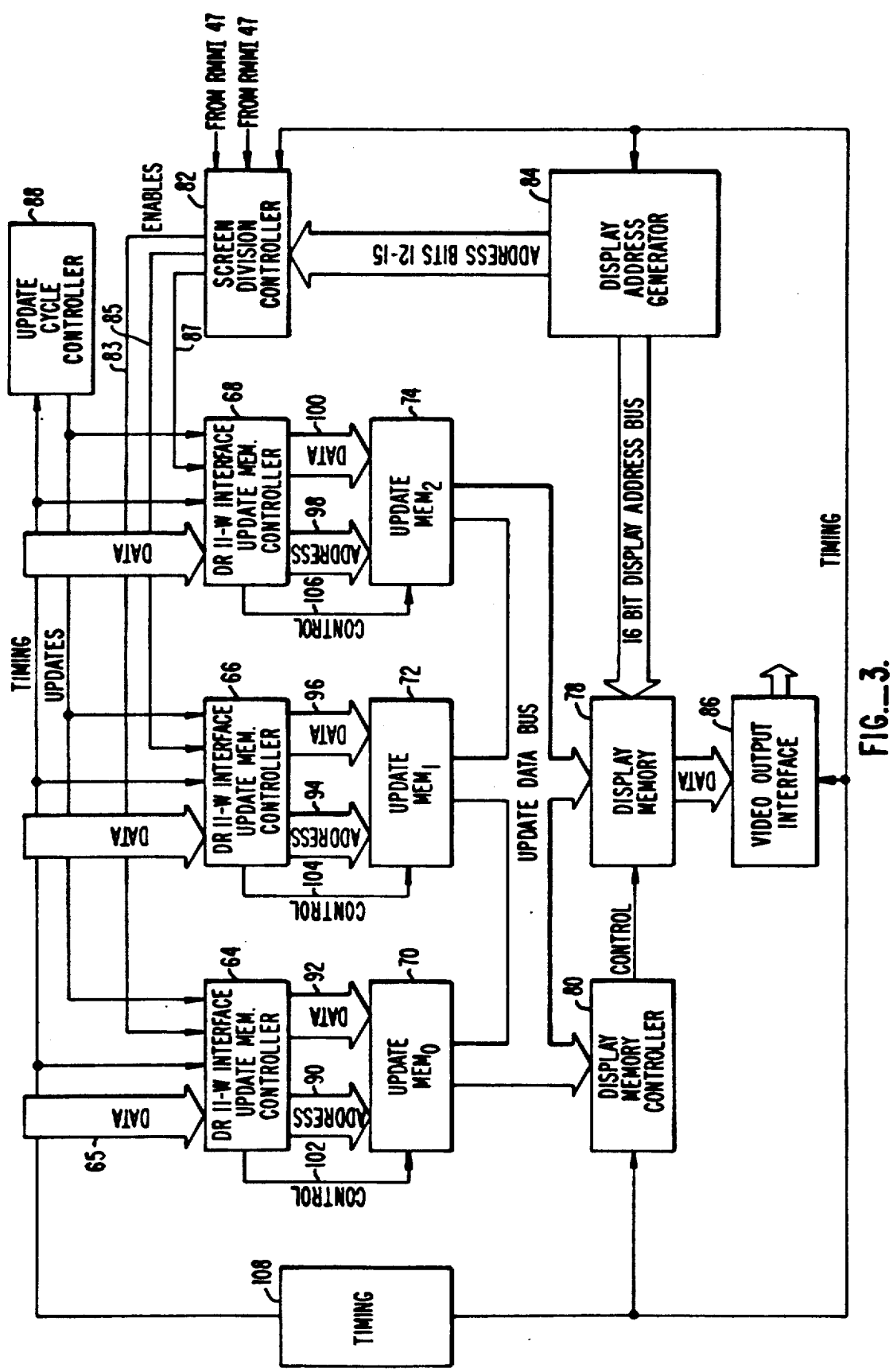
FIG._3.

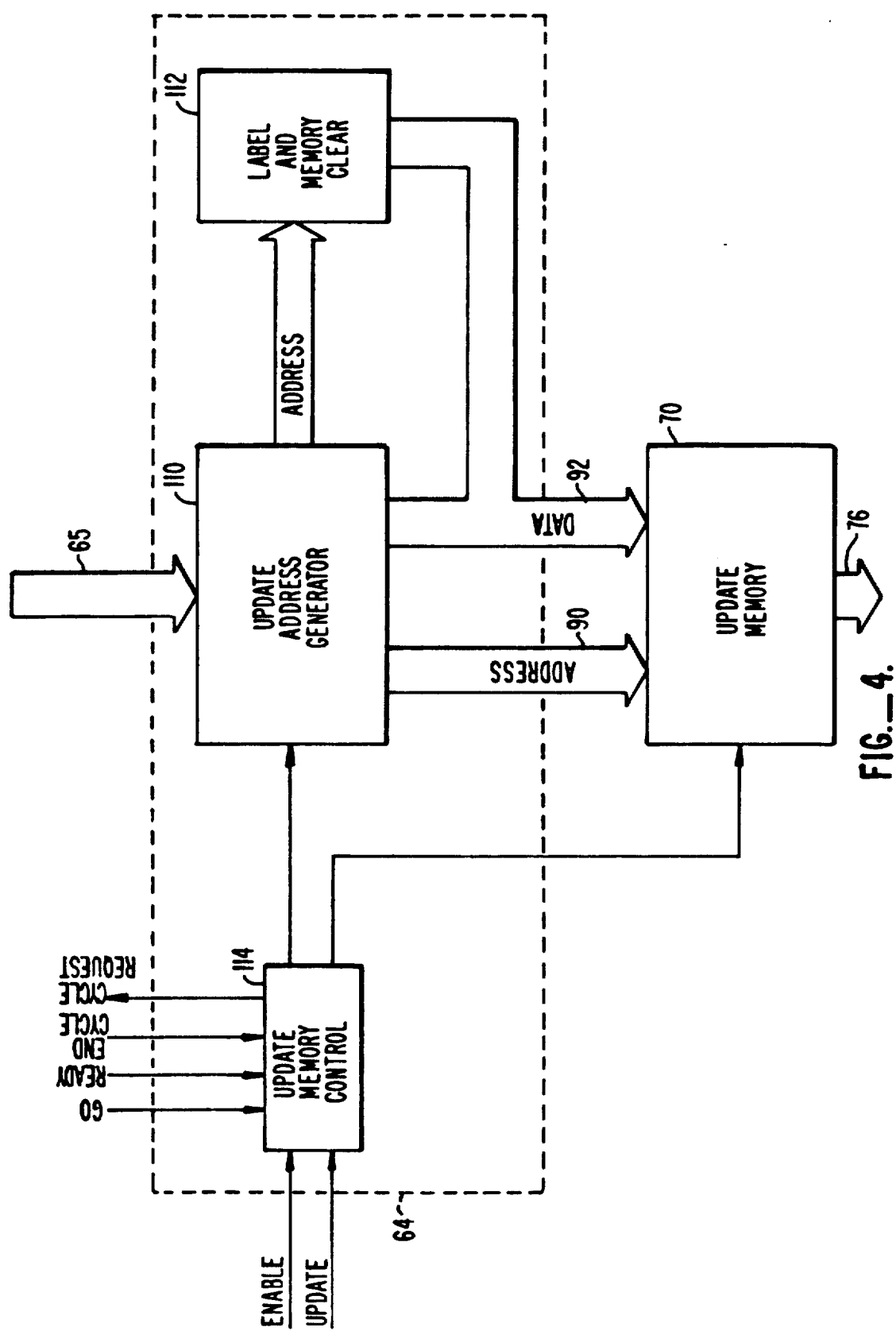

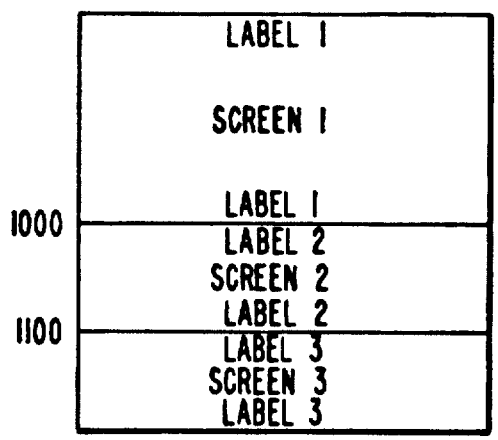
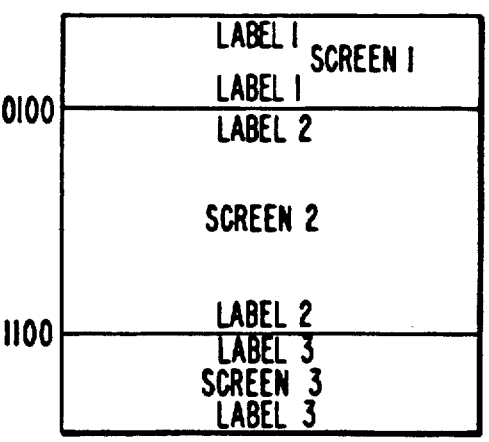
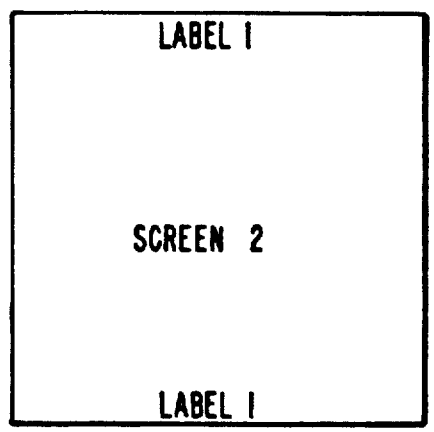
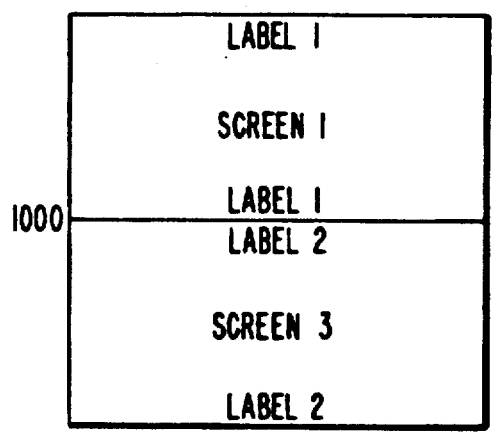
FIG._5.

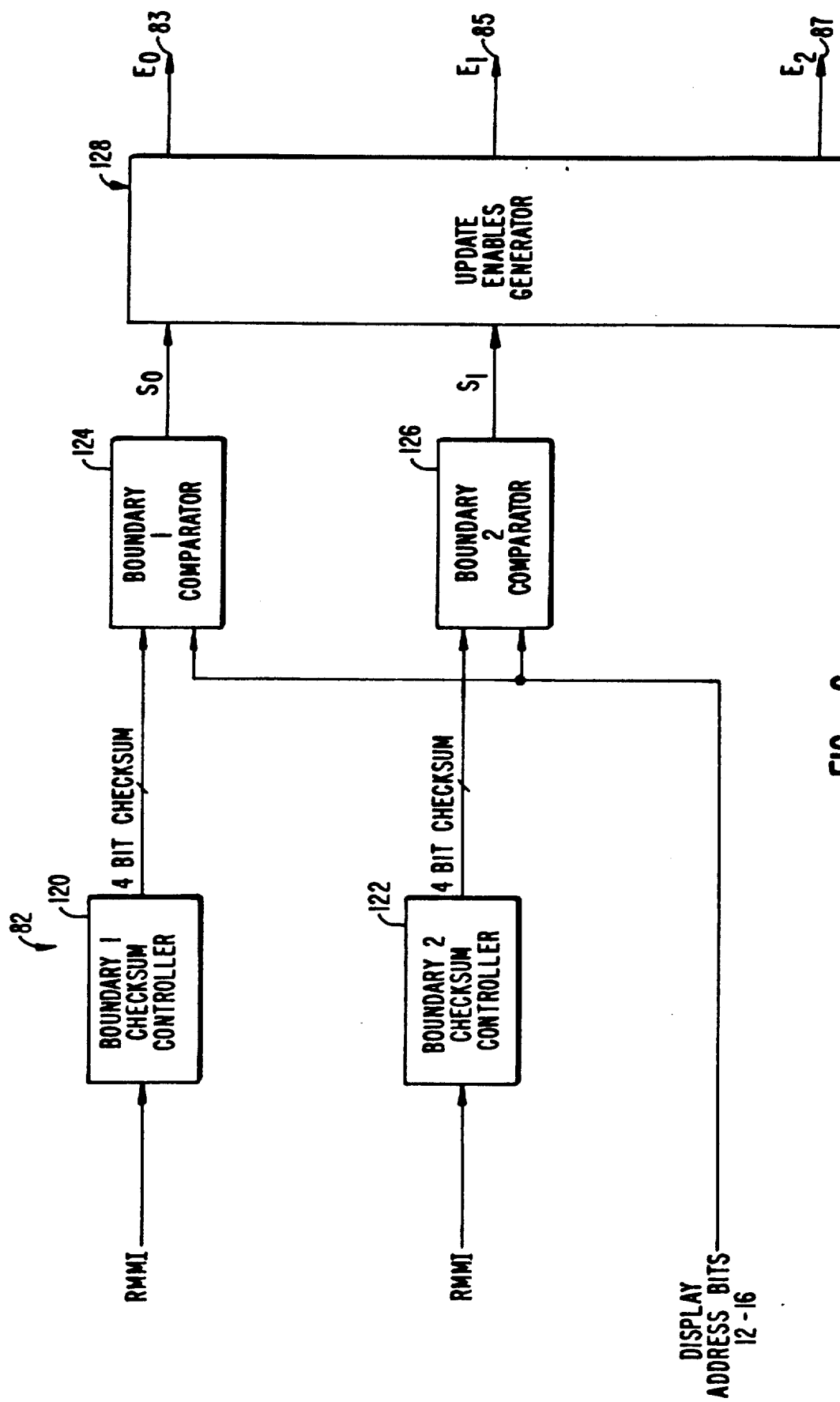
FIG._6.

MULTILEVEL SECURE WORKSTATION

BACKGROUND OF THE INVENTION

This invention relates to a secure computer workstation and more particularly to a computer workstation whereby information can be processed locally and retrieved and stored both locally and remotely with reliable security in a window display environment.

There is a growing need for securely interconnecting data processing systems, particularly for use in government applications. Network security technology, together with local area network (LAN) Technology, allows powerful workstations on a local area network to intercommunicate securely among themselves and with mainframe computers. However, in order that workstations may qualify for security sensitive applications, each workstation must operate according to modes which satisfy certain security requirements. Types of security requirements are found in the standard reference *DoD Trusted Computer System Evaluation Criteria*, CSC 5200.28-STD, Dec. 1985 (approx. 50 pp). Often such modes require that compartmentalized data be internally separated.

Important to an understanding of a computer workstation is a window display environment. The window display environment is based on the concept of a process. A process is an independent unit of activity or operation on behalf of a specific system user or on behalf of a system itself. A process can be thought of as a program in execution. However, different users running the same program can have different processes running the program, or a single user running different programs or the same program multiple times can have different processors running the programs. A window idiom is a tool for display of multiple processes essentially simultaneously. Certain processes must be protected to assure integrity and security in information. Data input which causes change in the content of the database and information transfer in a multilevel security environment are two particularly sensitive examples of actions requiring restrictive control.

In the past, one of the main obstacles to development and application of a secure computer system has been the availability of so called "trusted software". In a security sensitive environment, it has been accepted that software must be verified as trusted. However, verifying software is a very lengthy and costly process which may not lead to the level of assurance sought.

An ideal secure computer system prevents unauthorized disclosure of information. Such a system demands that processes at different security levels be isolated from each other and upon display on the workstation.

In the past, the problem of implementing such a security system has been directed primarily to the development or modification of operating system software. Following such an approach, it is necessary that software be testable to verify security. Moreover, the application software used with such software operating systems must be shown not to allow or cause a breach in security.

The present invention represents a departure from methods relying on use of security-qualified software, enabling the use of general purpose software and generally-available components of commercially available computers and computer workstations. The exact implementation of the invention will be outlined hereinafter.

The following patents were uncovered in a search of the United States Patent and Trademark Office:

| U.S. Pat. No. | Inventor |
| --- | --- |
| 4,484,302 | Cason et al. |
| 4,642,790 | Minshull et al. |
| 4,644,496 | Andrews |
| 4,646,261 | Ng |
| 4,648,061 | Foster |

The above patents disclose display window systems of various types. The '302 patent describes a text processing system which is divided into virtual displays, each of which permits independent processing of operator interface to the system. The system requires the use of a single central processor for controlling operation of the apparatus in connection with a partitioned memory and a display access method program for running a plurality of service programs. No attention has been given to the problem of providing multilevel security.

The '496 patent describes a computing network and apparatus for routing and transferring information in the computing network. No attention has been directed to the problem of multilevel security.

The '790 patent describes an interactive display system for presenting data to a user through windows on the display. A screen manager is employed to map the data contained in defined windows into locations on the screen determined by corresponding positions of viewports. No attention has been directed to the problem of multilevel security.

The '261 patent relates to a local video controller for use in connection with a video terminal including a terminal processor in a video memory for storing video information for displaying on a terminal screen. The local video controller includes a change detect circuit to send updated video information to the video memory at the terminal. No attention has been directed to the problem of multilevel security.

The '061 patent relates to an electronic document distribution network and the problem of the dynamically variable nature of a distribution network in providing document interchange protocols between any two processors in the network. No attention has been directed to the multilevel security problem.

SUMMARY OF THE INVENTION

According to the invention, a multilevel secure workstation is provided having network access and multi-window human user interface wherein each workstation has a plurality of secure screen divisions (called windows in some usages, that is, a visual interface for a process wherein each process is secured against unauthorized access. Security is achieved by providing a display interface coupled to receive data from independent secure processors for each screen division or from a secure source of data. There is physical restriction on manual input or access to the display interface and isolation of processors from one another.

In a specific embodiment, a display generator is provided having a display memory, a plurality of input interfaces restricted to providing digital data from secure sources, such as secure workstation processors or a secure image data stream, an update memory associated with each input interface, a display memory controller which delimits access to areas of the display memory by means of counters and pointers which prevents interaction of display data in the display memory, output security level labeling means for labeling each segment of information, and an output means for generating signals for the video display which combines output of said labeling means and output from preselected locations of the display memory wherein all information within a screen division is displayed as a whole with a security label.

Further according to the invention, means are included for erasing the update memory once information is transferred to the display memory in order to prevent inadvertent internal mixing of data.

An important feature of the invention is that data input to the update memory is limited to information which has been processed by a single processor. A display memory can be fed by a plurality of update memories.

A workstation according to the invention may be assembled from commercially available subsystems and coupled to a display generator according to the invention. The operator interface, such as a keyboard and pointing mechanism are always coupled through a secure processor to restrict access between the user and the display device.

This invention provides a computer workstation which satisfies the needs for processing power and the requirements for security as specified by known U.S. Government standards. The object of the security standards is to prevent unauthorized disclosure of information. The environment has been defined and the security assumptions have been described in such publications as "A Security Model and Policy for a Multi-Level Secure Local Area Network," by Peter Loscocco, *Security and Privacy Conference*, Berkeley, Calif., 1987. In particular, the level care required for handling classified information while providing access to significant computer processing power is addressed by the present invention.

The invention will be better understood by reference to the following detailed description in connection with the accompanying drawings.

BRIEF DESCRIPTION OF THE DRAWINGS

FIG. 1 is a block diagram of a computer workstation according to the invention in a security environment.

FIG. 2 is a block diagram of a specific embodiment of a computer workstation according to the invention.

FIG. 3 is a block diagram of a specific embodiment of a display generator in accordance with the invention.

FIG. 4 is a block diagram of a representative update address controller and update memory coupled by an address bus and a data bus.

FIGS. 5a-d block diagrams illustrating allocation of locations for display information in a display memory according to the invention.

FIG. 6 is a block diagram of a screen division controller 82 according to the invention.

DESCRIPTION OF SPECIFIC EMBODIMENTS

In order to understand more fully the context of the invention, a few concepts related to the present invention need to be explained.

A display as herein understood is a presentation to a user on a display device, such as a cathode ray tube video display terminal. The display is typically in the form of presentation graphics, which may be character-based or pixel-based. As used in the embodiments described herein, it is generally assumed that the presentation is on-off bit-mapped pixel-based graphics. However, other display graphics modes may be used without departing from the basic concept of the invention.

A screen division is a segment of presentation graphics as seen by the user. In the present invention, a display comprises a plurality of independent screen divisions, each screen division sharing a single display device so that multiple screen divisions may appear as a single display. According to the invention, a single screen division corresponds to a single security level.

A window is a process controlled by a single processor or central processing unit. A plurality of windows may reside on a screen division and may be moved within a screen division. However, according to the invention, a single window cannot overlap screen divisions and cannot move between screen divisions.

Referring to FIG. 1, there is shown a secure environment 10 which includes a computer workstation 12 according to the invention. The workstation 12 is coupled to its environment at a plurality of ports 14, 16, 18 through for example a first standard trusted computer base (TCB) 20, a second TCB 22 and a secure imagery source 24, respectively. Greater or fewer TCB-secured ports may be provided, depending on the configuration of the workstation.

The data provided to the workstation may be of a nature permitting no manipulation. The secure imagery source 24 for example might be for providing digital satellite data or the like having a "Secret" security classification. Other ports may provide for both input and output.

A secure local area net (LAN) 26 is assumed to be provided which routes data to and from the ports 14 and 16 of workstation 12 at the defined security levels through respective TCBs 20 and 22. The secure LAN 26 enables communication between nodes (represented by TCBs 20, 22, 30, 32, 34, 36) of equivalent security levels in isolation from TCBs at other security levels thus preventing communication between TCBs of nonequivalent security levels. The standards for a secure LAN are described elsewhere. Established security rules specify that no information may flow down to a secure node of a lower security level from a secure node of a higher security level, that information may flow only between nodes of equal security levels, that no information may flow between a node of a lower security level to a node of a higher security level absent a need to know. To this end, a guard means 28 is provided between TCBs at different security levels to prevent unauthorized disclosure of information between security levels. Thus the first TCB 20 may communicate with the second TCB 22 only through the guard means 28 via the third TCB 30 and the fourth TCB 32, which are coupled through the guard means 28. A disk 38 is coupled to the secure LAN 26 through the file server 40, via at least one TCB 34 and perhaps a further TCB 36 which are qualified for direct connection with TCBs at an equivalent security level.

In accordance with the invention, each port of the workstation 12 has a defined security level as specified by a TCB, and a processor 42, 44 is associated with each TCB 20, 22 and coupled thereto via a dedicated port 14, 16, respectively. Each processor 42, 44 associated with a port 14, 16 is restricted to processing data at the security level associated with . the defined security level of the TCB 20, 22. For example, the first processor 42 may be a processor dedicated to process functions classified as "Secret" while the second processor 44 may be a processor dedicated to process functions classified as "Top Secret."

Within the workstation 12, there is a man machine interface (MMI) 46 provided for manual input to each of the respective first and second processors 42 and 44 independent of one another. As exemplary input devices to the MMI 46 are a keyboard 48 and a pointing device such as a mouse 50. Other manual input devices may be provided such as a light pen, a digitizer or a voice recognition device. In addition a restricted MMI (RMMI) 47 is provided which is coupled to the display generator 52. The RMMI 47 is restricted to the providing of border control between screen divisions as hereinafter explained. The borders might be controlled through for example a mouse connection having limited functionality.

Referring to FIG. 2 for a specific example of a workstation 12, the first and second processors 42, 44 may be for example the processor units of a Sun 3 workstation, each having a standard VME bus 56, 58 each of which is coupled for example to a standard DR11-W 16-bit parallel interface unit 60. 62 restricted to data and control output. Other interfaces may be used as the application demands.

Referring to FIGS. 1 and 2 together, the first and second processors 42, 44 are coupled to a display generator 52 constructed according to the invention. The display generator 52 receives data and displays information in isolation as between processors, thereby to establish a security barrier between screen divisions. The display generator 52 is coupled to a video display device 54, such as a workstation VDT, to provide usable output of information in video form. Image information may also be provided directly to the display generator 52 via port 18 from the imagery source 24 through an update memory. Significantly, the secure imagery information cannot be altered or internally manipulated by the workstation 12. The only path of communication between the MMI 46 and the display generator 52 is via a processor, and each processor is restricted in output to other processors via TCBs and a suitable guard means, as shown in FIG. 1. The output information intended for video form is merely displayed, and it is isolated within the display generator 52 as hereinafter explained.

Referring now to FIG. 3, there is shown a block diagram of a display generator 52 in accordance with the invention. The display generator 52 comprises a plurality of update memory controllers 64, 66, 68 with input interfaces, a plurality of update memories 70, 72 and 74, an update data bus 76, a display memory 78, a display memory controller 80, a screen division controller 82, a display address generator 84, a video output interface 86 for a monitor (not shown), an update cycle controller 88, and other features as hereinafter explained.

The update memory controllers 64, 66, 68 are each coupled to receive data from an independent source of data, such as a standard DR11-W interface or an image data source (FIG. 1). It is assumed that each independent source of data is protected by a TCB and secure connections. It is purpose of this invention to assure continued security and hardware isolation between these data sources by providing independent support for each one of a plurality of processors generating single bit pixel data directed to a display device, as is hereinafter explained.

To this end each update memory controller 64, 66 and 68 is coupled through respective independent and isolated data and address paths 90, 92; 94, 96; and 98, 100 to the respective update memories 70, 72 and 74. Respective control connections 102, 104 and 106 are also provided from the respective update interface controllers 64, 66 and 68. The update memories 70, 72 and 74 are each connected via the update data bus 76 to the display memory 78. The update memories 70, 72 and 74 are each the same size as the display memory 78 so they can each provide a full screen of data. The first word of data transferred is used as the starting address of data to be transferred to the display memory 78. In one embodiment, the location of data stored in the display memory 78 may have the same address as the location of data read from the update memory 70, 72, 74. Such a scheme has the advantage of direct address correlation among all memories.

In the specific embodiment discussed herein, the data stored in the update memory 70, 72, 74 is always read from the beginning of the update memory, and the address location in the display memory 78 is established by the screen division controller 82 which provides individual read enable signals 83, 85, 87 to the update memory controllers 64, 66, 68 in response to addresses generated by the display address generator 84 (which is basically a serial counter). The display address controller 80 has a data output path coupled to the update data bus 76 to provide a data path for initializing the display memory 78. During other read operations, this data output path is disabled.

Necessary security labeling associated with the data directed to each of the update memories 70, 72, 74 is provided before the data is written to these memories as part of the update memory controllers 64, 66 and 68. However, it is assumed that the respective TCBs supply a suitable encoded label to which the update memory controllers 64, 66, 68 can respond.

The screen division controller 82 is coupled to receive control input from the RMMI 47 and a selected order of address bits from the display address generator 84. The size and locations of windows appearing on the screen division thereby controlled through control codes for the update memory controllers 64, 66, 68, as hereinafter explained. The display address generator 84 also generates the display addresses for the display memory 78.

Overall time sequence is controlled by a timing generation means 108, with timing provided directly to the update cycle controller 88 (which is coupled to the update memory controllers 64, 66, 68), to the update memory controllers 64, 66, 68, to the display memory controller 80, to the video output interface 86, to the display address generator 84 and to the screen division controller 82.

Various labeling schemes were considered for use with a black and white display. The preferred embodiment is a labeling scheme whereby security labels are provided at least at the top and desirably also at the bottom of each screen division and all screen divisions independently displayed without overlap so that the displayed labels are never covered by another overlapping screen division. Within each screen, representing an independent security level, overlapping windows are permissible.

Referring to FIG. 4, there is shown a representative update address controller 64 with an update memory 70 coupled by address bus 90 and data bus 92. A 16-bit input interface via data bus 65 is provided in this example according to DR11-W conventions (as used in connection with a VME bus on Digital Equipment Corporation MicroVAX II-type computers or Sun Microcomputer Corporation SUN-3-type workstations) to an update address generator 110, which in turn generates address information for a label and memory clear subsystem 112, the label output of which is data into the update memory 70 beginning at the start of the memory. The update memory 70 is for example a dual port 64-kilobit static random access memory (64K SRAM) having a 16-bit word length.

An update memory controller 114 is responsive to Enable, Update, Ready, Go, and End Cycle signals generates a Cycle Request signal, enables the update address generator 110 and the update memory 70 and arbitrates race conditions among the Ready, Update and Go signals so that an address counter can be properly set. According to the invention, the update address generator 114 is a hardware counter, such as a pair of type 867 8-bit counters. During a read (display memory update) cycle, the initial value is always zero and the counter is incremented during the period its counter is enabled via the enable line 83 from the screen division controller. During a DR11-W write cycle, the counter will be loaded with an initial memory address given by the first word of the input from the DR11-W input interface, and then the counter increments from that initial memory address through the address space of the update memory.

The DR11-W-type interface is capable of transmitting address and pixel data in 16-bit words and must have its own independent address counter for data transfer. The DR11-W-type interface is capable of randomly writing to locations in the update memory 70 by specifying the starting address in the first word of the data transferred. The circuitry latches this starting address into the address counter, and all subsequent data is written to sequential locations in the update memory 70.

Security labeling of the data is done before the data is written to the update memory 70, 72, 74. Addresses in the update memory which are below a certain value are masked and replaced with a suitable label from a heading lookup table (HLUT), which is a read-only memory (ROM) within the label and memory clear subsystem 112. The update address generator 110 supplies the low-order bits of the address which combine with high-order bits from a corresponding TCB (FIG. 1). These high-order bits represent the encoded security label and also specify the starting address of the proper label. Separate but identical HLUTs are provided for each update memory to assure physical security and accurate labeling.

Timing is provided by a system clock in timing means 108 (FIG. 3) associated with the display generator 52. The system clock may run at 1/16 of the pixel rate to support transfer of one-bit pixel data transferred in 16-bit words. Because of this simple relationship, design of a complete state machine is greatly simplified. Intervals of time between successive reads from the display memory 78 are used to update (write to) the display memory 78 with a word of data from the update memory 70 via the update data bus 76. This sequence is described as "write a word to display memory, read the word and send the word to the output device." In a specific embodiment, the entire content of the display memory 78 is sent to the output device each 1/60 sec, which corresponds to the update cycle. If for any reason the update cycle is inhibited, the last or existing word in the display memory 78 is sent to the output device. Significantly, this technique allows use of only one address counter for writes and reads to the display memory 78.

Each update memory 70, 72, 74 is in turn given the update cycle. The processor associated with each update memory has priority over the update memory and can inhibit the update cycle if in a "memory write" sequence.

The division of the display into secure screen divisions according to the invention is accomplished by enabling each update memory 70, 72, 74 to write to the display memory 78 during a selected portion of its update cycle. If for example one processor is allocated the top portion of the screen, its update memory is enabled by an enable signal during a corresponding first portion of its update cycle.

In FIG. 5, part A, there is shown a first example of memory allocation in the display memory 78 for illustrating boundary control between secure screens. Flags S0 and S1 are generated within the screen division controller 82 at predefined screen addresses which correspond to checksums manipulated from the RMMI 47, which in a specific example are each 4-bit checksums defining locations of vertical boundaries between screen divisions on a display.

Referring to FIG. 6, there is shown a block diagram of a screen division controller 82 according to the invention. The screen division controller 82 comprises a first boundary checksum controller 120, a second boundary checksum controller 122, a first boundary comparator 124, a second boundary comparator 126 and an update enable generator 128. The first boundary checksum controller 120 is coupled to receive a first input signal from the RMMI 47 and to provide as output a first stored four-bit checksum to the first boundary comparator 124. The second boundary checksum controller 122 is coupled to receive a second input signal from the RMMI 47 and to provide as output a second stored four-bit checksum to the second boundary comparator 126. The first boundary comparator 124 and the second boundary comparator 126 are coupled to receive as input selected display address bits to be matched against the respective checksums. The S0 and S1 signal flags are generated as a result of the outputs of the comparators 124 and 126 comparing preselected boundary addresses with current address values. The signal flags S0 and S1 are provided to the update enable comparator 128, which is a simple combinatorial logic to exclusively enable a single one of the respective enable lines 83, 85, and 87 to allow each of the respective update memories 70, 72, 74 to be read during its update cycle.

In the example of FIG. 5, part A, a first checksum register of the boundary checksum controller 120 (FIG. 6) is loaded with the binary value 1000, and a second checksum register of the second boundary checksum controller 122 is loaded with the binary value 1100. This corresponds to an initial screen division based on display memory allocation at 0000, 1000, 1100 and 1111.

In the example of FIG. 5, part B, the first checksum register is loaded with the binary value 0100, and the second checksum register is loaded with the binary value 1100. This corresponds to a screen division based on display memory allocation at 0000, 0100, 1100 and 1111.

In the example of FIG. 5, part C, the first checksum register is loaded with the binary value 0000, and the second checksum register is loaded with the binary value 1111. This corresponds to no screen division since the entire display memory is allocated to a single processor.

In the example of FIG. 5, part D, the first checksum register is loaded with the binary value 1000, and the second checksum register is also loaded with the binary value 1000. This corresponds to a division between screen division and screen division 3 without a screen 2 based on display memory allocation at 0000, 1000 and 1111.

Timing of the video output is critical. For the purpose of generating suitable blanking and synchronization levels, a digital to analog converter is incorporated in the video output interface 86. Timing means 108 provide the video output interface 86 with proper synchronization and blanking pulse to meet one set of monitor specifications. The digital to analog converter is preloaded with a fixed output voltage level to provide only two possible visible voltage levels. The digital to analog converter may then be supplied with single bit pixel data at the pixel rate for bit-mapped image display.

The update memory control 114 and label and memory clear system 112 (FIG. 4) cooperate to accomplish three different control tasks: the asynchronous memory write from the DR11-W data source, the synchronous update cycle and the synchronous initializing of the update memory 110. Initializing is employed according to the invention as a security feature to prevent unauthorized mixing of data. As soon as a label is changed or a reset is received from the processor 42, or as soon as a change in the TCB input lines is detected, the update memory 70 is simply cleared.

The display memory 78 is initialized according to security requirements. The display memory controller 80 controls normal update of the memory and memory initializing at system reset. In all cases, initializing is accomplished by writing zeroes to all memory locations.

The display address generator 84 comprises a counter, such as a pair of type 74F269 counters or less expensive equivalents which have suitable speed characteristics. The address so generated is sent to the display memory 78, and a suitable number of bits is also sent to the screen division controller 82. The screen division controller 82 is the location of the counters and comparators which control the update memory controllers and use the S0 and S1 signal flags, as explained above.

The invention has now been explained with reference to a specific embodiment. Other embodiments will be apparent to those of ordinary skill in this art. For example, a larger plurality of processors may be provided or a different labeling technique may be implemented than specific embodiments herein described. It is therefore not intended that this invention be limited, except as indicated by the appended claims.

What is claimed is:

1. A secure computer workstation apparatus for processing classes of information, each class of information corresponding to a defined security level, and for presenting a display of said information on a screen of a video display device, said apparatus comprising:

a plurality of computer processors, each one of said computer processors constrained to operate in a single defined security level providing security control independent of any other of said computer processors;

a plurality of output interfaces, each one of said output interfaces coupled to and restricted to receive output data and control information from a single one of said computer processors; and a display generator coupled to said output interfaces, said display generator comprising:

a plurality of input interfaces restricted to providing digital data from secure sources, including from said computer processors, a single one of said output interfaces being coupled only to a single one of said input interfaces, a plurality of update memories, each one of said update memories being coupled to only one of said input interfaces for receiving data through said input interface from only a single one of said secure sources, a display memory coupled to receive data from all of said update memories for assembling said data into display information for display on said screen of said video display device, a display memory controller coupled to said display memory to control display of contents of the display memory, said display memory having memory locations restricted to a one-to-one correspondence with display locations on said screen of said video display device, a screen division controller means coupled to said update memories for limiting access of said update memories to selected address locations of the display memory, said screen division controller means comprising a first comparator and a second comparator, for comparing current memory locations with predefined memory locations and to issue update memory read enable signals to write to predefined locations of said display memory, said screen division controller means defining individual and independent screen divisions through selection of blocks of address locations, and an output means coupled to said display memory for directing output from said selected address locations defined by the display generator of the display memory and generating signals for said video display device to direct data to only one of said screen divisions having a defined security level, each said screen division comprising a portion of said screen of said video output display.

2. The apparatus according to claim 1 wherein said display generator further includes:

security level labeling means for labeling each said screen division; and wherein said update memory is also coupled to said security level labeling means for combining output of said security level labeling means and output from said computer processors, such that all information within a screen division is displayed as a whole with a security label.

3. The apparatus according to claim 2 wherein said security level labeling means comprises means for directing a security level label to predefined locations within at least one of said update memories, such that a read of the update memory includes a read of a security level.

4. The apparatus according to claim 3 wherein said display generator further includes a display address generator coupled to said display memory and to said screen division controller means for providing an incrementing address signal for each read and write of the display memory.

5. The apparatus according to claim 4 wherein said display address generator comprises a counter, said counter being initialized at zero at the commencement of each read and write cycle and incrementing sequentially through all addresses of said display memory.

6. The apparatus according to claim 1 wherein said display generator further includes means for erasing each update memory under predetermined conditions, including a change in security level and upon transfer of information to the display memory, said erasing means being operably coupled to said update memories and to said input interfaces.

7. The apparatus according to claim 5 wherein input to any single update memory is coupled to be received only from a single one of said computer processors such that information displayed on any single screen division is limited to information which has been processed by a secure processor limited to manipulation of only one security level of data.

8. The apparatus according to claim 1 wherein at least one said input interface is an imagery input interface for transferring to said display generator imagery data directed from a security classifiable source.

9. The apparatus according to claim 1 wherein access between a user and the video display device is restricted by limiting user input to direction through means for interfacing between the user and a machine coupled only directly to at most one of said computer processors at any one time.

* * * * *